Figure 1:
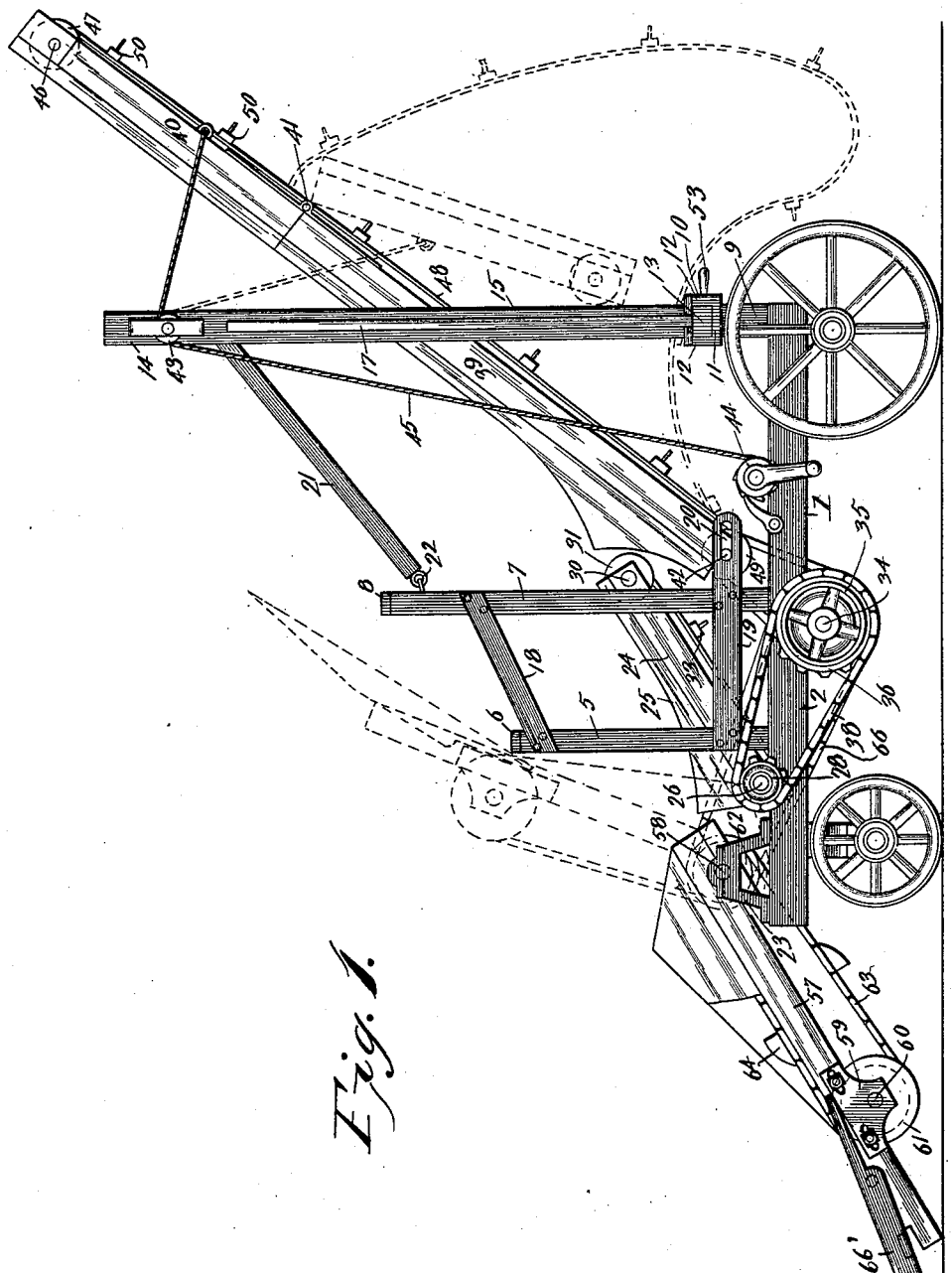

No. 676,412. Patented June 18, 1901.
A. BOUCHEY.
HAY OR GRAIN STACKER.
(Application filed Feb. 14, 1901.)
(No Model.) 2 Sheets—Sheet 1.

Witnesses  A. Bouchey, Inventor
by C. A. Snow & Co.
Attorneys

No. 676,412. Patented June 18, 1901.
A. BOUCHEY.
HAY OR GRAIN STACKER.
(Application filed Feb. 14, 1901.)
(No Model.) 2 Sheets—Sheet 2.
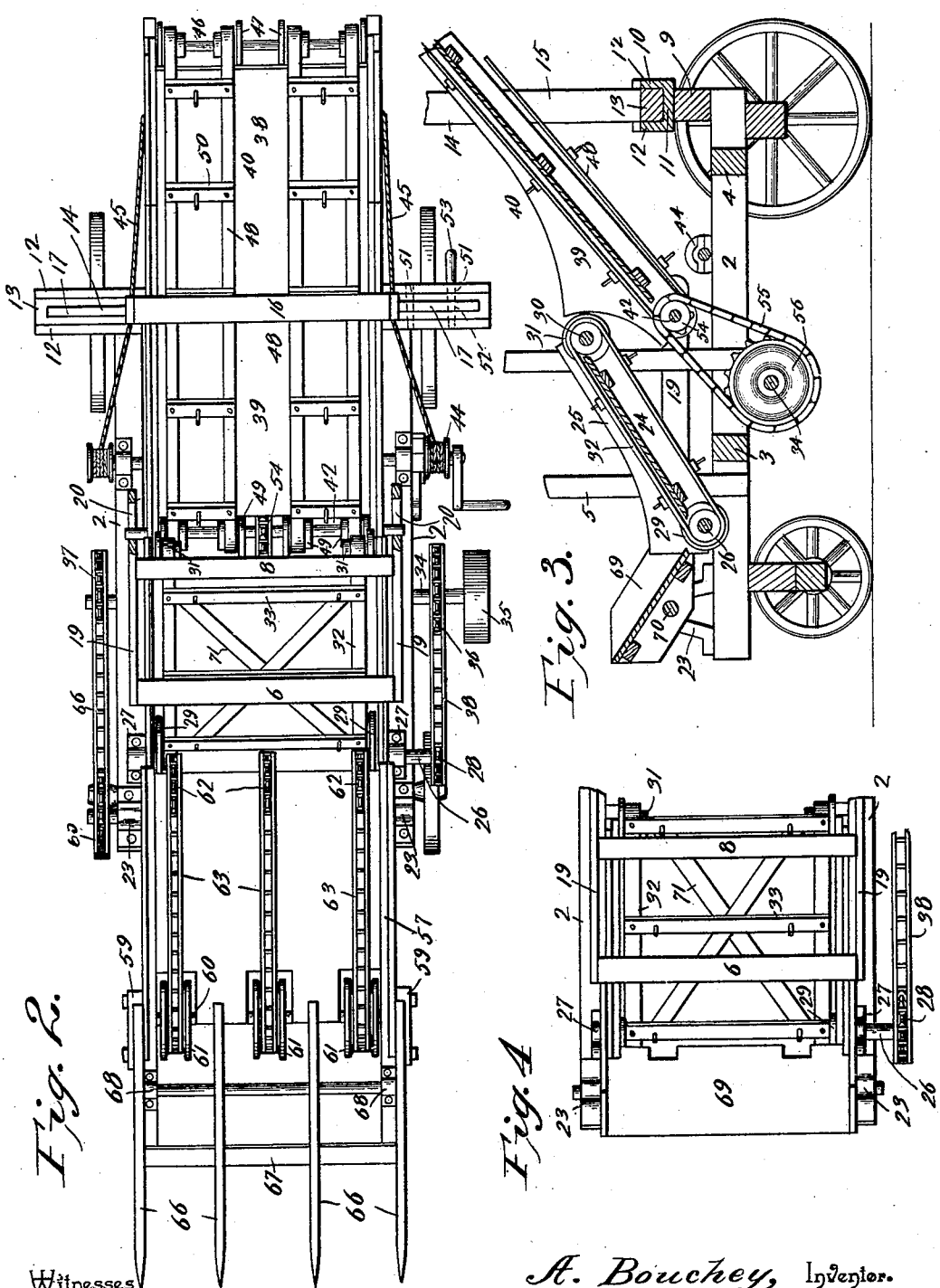
A. Bouchey, Inventor.

UNITED STATES PATENT OFFICE.

ALFONSO BOUCHEY, OF MAPLEHILL, KANSAS.

HAY OR GRAIN STACKER.

SPECIFICATION forming part of Letters Patent No. 676,412, dated June 18, 1901.

Application filed February 14, 1901. Serial No. 47,313. (No model.)

*To all whom it may concern:*

Be it known that I, ALFONSO BOUCHEY, a citizen of the United States, residing at Maplehill, in the county of Wabaunsee and State of Kansas, have invented a new and useful Hay or Grain Stacker, of which the following is a specification.

My invention is an improved grain and hay stacker; and it consists in the peculiar construction and combination of devices hereinafter fully described and claimed.

In the accompanying drawings, Figure 1 is a side elevation of a hay and grain stacker constructed in accordance with my invention. Fig. 2 is a top plan view of the same, partly in section, on the line *a a* of Fig. 1. Fig. 3 is a partial longitudinal central sectional view of my improved grain and hay stacker with the feeder removed and the hopper-box for feeding headed grain thereto substituted instead of the feeder. Fig. 4 is a partial top plan view of the same.

The supporting wheeled frame 1 may be of any suitable construction. As here shown it comprises a pair of side beams 2 and cross-bars 3 4, which connect the same together. A pair of vertical standards 5 rise from the beams 2 at a suitable distance from the front end of the frame and have their upper ends connected together by a plate 6. At a suitable distance in rear of the standards 5 are a pair of vertical standards 7, which are somewhat higher than the standards 5 and have their upper ends connected together by a plate 8. On the rear end of the frame 1 is a bolster 9, which is provided on its upper side with a guide 10, comprising a bottom bar 11 and vertical sides 12. In this guide and adapted to be shifted longitudinally therein in a direction transverse with relation to the frame 1 is a sill 13, which supports a gallows-frame 14, the same comprising vertical studs 15, a plate 16, which connects their upper ends together, and brace-bars 17, which brace the said gallows-frame against lateral stress. The standards 5 7 are connected together near their upper ends by inclined bars 18. Horizontally-disposed longitudinal bars 19 are bolted or otherwise secured to the said standards 5 7, their rear ends projecting beyond said standards 7, and the said rear ends of the said bars 19 are provided with elongated slots 20. Brace-bars 21 are rigidly attached to the sides of the gallows-frame and have their front ends flexibly connected to the standards 7, as at 22. On the side bars 2 at the front end of frame 1 are bearings 23.

The frame 24 of an inclined feed-conveyer 25 is secured to and supported by the standards 5 7. A shaft 26 has its bearings in the said frame 24, at the lower end thereof, and in bearing-blocks 27 on the frame 1, and said shaft has at one end a sprocket-wheel 28. Said shaft is further provided with pulleys 29, which are disposed immediately within the sides of frame 24. A shaft 30 has its bearings in the sides of frame 24, at the upper rear end of the latter. Said shaft 30 has pulleys 31, which are in line and identical with the pulleys 29 and are connected to the latter by endless traveling belts 32, which are connected together by suitable flights 33. The said belts 32 and flights 33 constitute, in connection with the supporting and actuating shafts 26 30, an endless traveling feed-conveyer, as will be understood.

A power-shaft 34 is journaled in bearings under the sides of frame 1 and is provided with a power-pulley 35 and with sprocket-wheels 36 37, which are on opposite sides of frame 1. An endless sprocket-chain 38 connects the sprocket-wheels 28 and 36. Power is thereby conveyed from the power-shaft 34 to the endless traveling feed-conveyer, as will be understood.

The frame 38 of the elevator which conveys the hay and grain to the stack is formed of a lower section 39 and an upper outer section 40, the said sections being hinged together at their meeting ends, on their lower sides, as at 41, and thereby the outer section 40 is adapted to be folded inward under the lower section 39 when the machine is not in use in order to compactly dispose the same. The shaft 42 at the lower end of the lower section 39 has its projecting ends bearing in the slots 20 of the bars 19. Thereby the lower end of the frame 38 is supported, and the said frame is adapted to be swayed laterally in order to deposit the hay or grain on different portions of the stack, the ends of the shaft 42 playing in the slots 20. The said frame 38 passes through the gallows-frame 15, and the latter is provided with sheaves 43. A winch 44 is mounted on the frame 1, and hoisting-ropes 45 are connected to the said winch, pass over the sheaves 43, and are attached to the frame 38 at a suitable distance from the outer end of the latter. By this means the frame 38 may be raised and lowered, as may be required. In the outer end of the outer upper section of the frame 38 is a shaft 46. Said shaft 46 and shaft 42 are provided with suitable pulleys 47, which operate the endless traveling belts 48. The said belts carry transversely-disposed flights 50, which serve to elevate the hay or grain, as will be understood. The gallows-frame is adjustable laterally on the bolster 9, thereby serving to turn the elevator-frame 38 to any required position. The sides 12 of guide 10 are provided with adjusting-openings 51. (Indicated in dotted lines in Fig. 2.) The sill 13 of the gallows-frame has a similar opening 52, which registers successively with the openings 51 when the gallows-frame is laterally adjusted. A locking-pin 53 is inserted in the registering openings 51 52 in order to lock the gallows-frame and elevator-frame at any required adjustment.

The shaft 42 has a sprocket-wheel 54, which is connected by an endless sprocket-chain 55 to a sprocket-wheel 56 on the power-shaft 34. Said sprocket-wheels 54 and 56 are at the centers of their respective shafts, and hence power is conveyed from the shaft to the endless traveling elements of the elevator at all adjustments of the latter, as will be understood.

When my improved stacker is used for stacking long straw or hay, I employ in connection therewith a feeder, which I will now describe.

A frame 57 has at its upper end a shaft 58, which has its bearings in the bearing-blocks 23 at the front end of frame 1. The lower end of the said frame when the machine is in operation rests on the ground. At a suitable distance from the lower end of frame 58, on opposite sides thereof, are adjustable bearings 59, in which is journaled a shaft 60. The latter is provided with pulleys 61, spaced at suitable distances apart. Shaft 58 is provided with sprocket-wheels 62. Endless traveling conveying sprocket-chains 63 connect the sprocket-wheels 62 and the pulley 61 and are provided with suitable spurs or teeth 64, which project from their outer sides. The shaft 58 has at one end a sprocket-wheel 65, which is connected to the sprocket-wheel 37 on shaft 34 by an endless sprocket-chain 66. Thereby power is transmitted from the power-shaft 34 to the shaft 58, and the upper leads of the endless sprocket-chains 63 are caused to travel upwardly and rearwardly on the bottom of the frame 57, and hence the said chains and the spurs or teeth with which they are provided serve to feed hay or straw thrown thereon or discharged thereon from a threshing-machine to the feed-conveyer, the latter serving to convey the same to the elevator, which carries it up and drops it onto the stack. The bearings 59 are adjustable in order that the conveying-chains 53 may be kept at the requisite tension. It will be understood that the shaft 58 and bearings 23 form a pivotal connection between the frame 37 of the feeder and the front end of the frame 1, and hence when the machine is not in operation the feeder-frame may be folded up against the frame formed by the standards 5 and plates 6, as shown in dotted lines in Fig. 1, in order to compactly dispose the same out of the way. A series of feed-bars 66, which are connected together by cross-bars 67, are pivotally attached to the lower portion of the feeder-frame 57, as at 68. The said feeder-bars, when the machine is used for stacking straw as the same is discharged from the threshing-machine, are run under the rear end of the threshing-machine. The pivotal connection between the feeder-bars and feeder-frame enable the former to adapt themselves to any inequality of the ground and to bear on the ground independently of the lower side of the feeder-frame 57.

When my improved stacker is employed for stacking headed grain, the feeder, hereinbefore described, is removed and a feeder box or hopper 69, which is of the construction shown in Figs. 3 and 4 of the drawings, is employed in lieu thereof. The sides of said feeder box or hopper are connected by a crossbar 70 of cylindrical form, the ends of which project beyond the sides of said box or hopper and form trunnions, which are adapted to rest in the bearings 23 to support said feeder box or hopper in position. The sides of the latter overlap the sides of the feeder-conveyer, and the inclined bottom of the said feeder box or hopper by gravity feeds the headed grain thrown thereon to the feeder-conveyer, as will be understood.

While the frame of the elevator is here shown as being formed in two sections, hinged together, this construction is optional and the frame of the elevator may be rigidly constructed, if preferred.

In order to cause the endless traveling belts of the feed-conveyer and elevator to travel at the same rate of speed under all conditions and to prevent them from slipping on the pulleys, the respective belts of said feed-conveyer and elevator are connected together by crossed belts 71. Hence the flights of said feed-conveyer and elevator are at all times maintained at right angles to said belts, as will be understood.

Having thus described my invention, I claim—

1. In a stacker of the class described, the combination of a supporting-frame, a feeder-conveyer thereon, an elevator-conveyer having pivots at its lower end mounted in slotted bearings with which the supporting-frame is provided, a laterally-movable gallows-frame through which said elevator-conveyer extends, and means to raise and lower the outer end of said elevator-conveyer, substantially as described.

2. In a stacker of the class described, the combination of a supporting-frame, having slotted bearings, a power-shaft having a sprocket-wheel, a laterally-adjustable frame mounted on the supporting-frame, an elevator-conveyer having an operating-shaft at its lower end supported by said adjustable frame and journaled in said slotted bearings of the supporting-frame, said operating-shaft having a sprocket-wheel, and an endless sprocket-chain connecting the said sprocket-wheels of said power and operating shafts, substantially as described.

3. A stacker of the class described, having a feeder comprising a frame, pivotally supported at its upper end and at its lower end adapted to rest on the ground, endless traveling carrier elements mounted on said feeder-frame, and inclined feeder-bars at the lower side of said frame, conducting to said carrier elements, substantially as described.

4. A stacker of the class described having a feeder comprising a frame, pivotally supported at its upper end and at its lower end adapted to rest on the ground, endless traveling carrier elements mounted on said feeder-frame, and feeder-bars pivotally attached to the lower portion of said frame and adapted to bear at their lower ends on the ground, substantially as described.

In testimony that I claim the foregoing as my own I have hereto affixed my signature in the presence of two witnesses.

ALFONSO X BOUCHEY.
his mark

Witnesses:
JOHN OGILVY,
JOHN SCOTT.